_United States Patent_ [19]

Taplin

[11] Patent Number: 4,749,936

[45] Date of Patent: Jun. 7, 1988

[54] POWER TRANSMISSION

[75] Inventor: Lael B. Taplin, Union Lake, Mich.

[73] Assignee: Vickers, Incorporated, Troy, Mich.

[21] Appl. No.: 926,103

[22] Filed: Nov. 3, 1986

[51] Int. Cl.[4] .............................................. G01R 27/04
[52] U.S. Cl. .................................. 324/58.5 B; 91/361; 318/669; 333/17 R; 333/263
[58] Field of Search .................. 91/1, 361; 324/58.5 B; 318/608, 669; 333/17 R, 253, 263

[56] References Cited

U.S. PATENT DOCUMENTS 3,932,795 1/1976 Kliphuis ........................ 333/17.R X
4,513,782 4/1985 Contartese et al. .............. 91/361 X Primary Examiner—A. D. Pellinen
Assistant Examiner—Morris Ginsburg
Attorney, Agent, or Firm—Barnes, Kisselle, Raisch, Choate, Whittemore & Hulbert

[57] ABSTRACT

An electrohydraulic servo system which includes a linear actuator having a cylinder and a piston variably positioned therewithin, a servo valve responsive to valve control signals for coupling the actuator to a source of hydraulic fluid, and control electronics responsive to piston position for generating the valve control signals. A coaxial transmission line is formed within the linear actuator to include a center conductor coaxial with the actuator and an outer conductor. A bead of ferrite or other suitable magnetically permeable material is coupled to the piston and surrounds the center conductor of the transmission line for altering impedance characteristics of the transmission line as a function of position of the piston within the cylinder. Position sensing electronics include an oscillator coupled to the transmission line for launching electromagnetic radiation, and a phase detector responsive to radiation reflected from the transmission line for determining position of the piston within the actuator cylinder.

15 Claims, 4 Drawing Sheets

POWER TRANSMISSION

The present invention is directed to position measuring devices, and more particularly to apparatus for determining position of the actuator piston in an electrohydraulic servo value and linear actuator system.

BACKGROUND AND OBJECTS OF THE INVENTION

In electrohydraulic servo systems which embody a servo valve coupled to a hydraulic actuator, particularly a linear actuator, it is conventional practice to monitor actuator position using an electroacoustic linear displacement transducer for example as marketed by Temposonics Inc. of Plainview, N.Y. and disclosed in U.S. Pat. No. 3,898,555. As conventionally employed in such systems, this transducer includes a magnet coupled to the actuator piston for motion conjointly therewith, and an electroacoustic waveguide adjacent to the path of the magnet. A current pulse is launched on a wire which extends through the waveguide and coacts with the field of the magnet to propagate an acoustic signal within the waveguide. A coupler or mode converter receives such acoustic signal, with the time between launching of the current pulse and receipt of the acoustic signal being a function of position of the magnet relative to the waveguide. This transducer is durable, is directly mounted on the actuator cylinder but magnetically rather than physically coupled to the actuator piston, and is capable of providing an accurate indication of actuator piston position. However, conventional electronics for obtaining such position reading are overly complex and inordinately expensive. Furthermore, such electronics are conventionally supplied in a separate package which must be appropriately positioned and protected in the actuator operating environment.

Copending U.S. application (V-3985) Ser. No. 849,540, filed Apr. 8, 1986, now abandoned, and assigned to the assignee hereof, discloses an electrohydraulic servo valve assembly which includes a servo valve and microprocessor-based control electronics mounted in a single package for connection to hydraulic equipment, such as a linear actuator. In a particular implementation of such disclosure in a servo-valve/linear-actuator combination, improved circuitry is featured for monitoring operation of the Temposonics type electroacoustic transducer. An initial current pulse is launched in the waveguide in response to a measurement demand from the micro-processor-based control electronics, and a counter is simultaneously reset. Upon receipt of the acoustic return pulse from the waveguide, the counter is automatically incremented and a current pulse is relaunched in the waveguide. The output of the counter includes facility for preselecting a number of launch/return cycles in the waveguide, and for generating an interrupt signal to the microprocessor-based control electronics to indicate that the preselected number of recirculations has been reached. An actuator position reading is stored in a clock which measures the amount of time between the initial measurement demand signal and the interrupt signal. The clock output is transmitted to the control microprocessor on demand.

Although the combination of the Temposonics type transducer and monitoring electronics disclosed in such copending application is considerably less expensive than that previously proposed, and is reliable in long-term operation, improvements remain desirable. For example, electronics for obtaining a measurement reading in the disclosure of the copending application occupies one-third of the total electronics package. Reduction in the quantity of required circuitry is desirable to reduce power dissipation and increase space available for implementing other control features. Furthermore, although a measurement reading is obtained very quickly relative to motion of the actuator piston, the system of the copending application does not continuously monitor piston position in real time.

A general object of the present invention, therefore, is to provide apparatus for determining position of a movable member, particularly for determining position of the piston in an electrohydraulic linear actuator, which is inexpensive to implement as compared with like devices in the prior art, which reduces the overall quantity of circuitry necessary to monitor motion, which is adapted to continuously monitor motion in real time, which is accurate to a fine degree of resolution, and/or which is reliable over a substantial operating lifetime.

SUMMARY OF THE INVENTION

Apparatus for determining position of a movable member in accordance with the present invention includes a coaxial transmission line having a center conductor and an outer conductor separated by a dielectric. The coaxial transmission line is terminated at one end in its characteristic impedance, and is electrically coupled at its other end to a source of electromagnetic radiation such as an rf generator. A bead or slug of magnetically permeable material is slidably carried with respect to the center conductor of the transmission line within the outer conductor and is operatively coupled to the member whose position is to be monitored, such that the slug is positioned along the transmission line center conductor as a function of position of the movable member. Electronics are coupled to the transmission line for determining position of the movable member relative to the transmission line as a function of radiation reflected by the transmission line.

In a preferred implementation of the invention for monitoring position of a piston in a linear hydraulic actuator, the piston includes a central aperture into which the center conductor of the transmission line extends coaxially with the piston and with the surrounding actuator cylinder. In a preferred embodiment of the invention, the coaxial transmission line includes a tube, with centrally suspended center conductor and a slidable bead of magnetically permeable material, projecting from one end of the actuator cylinder into the central aperture of the opposing piston. An annular magnet is carried by the piston externally of the tube and is magnetically coupled through the tube to the bead slidable on the center conductor. In another embodiment of the invention, the outer conductor of the transmission line is formed by the actuator cylinder, and the center conductor extends into the piston aperture in sliding contact therewith as the piston moves axially of the cylinder. In this embodiment, the bead, which controls energy reflection in the transmission line, is carried directly by the piston surrounding the center conductor. Position readings are taken as a function of phase angle between energies launched and reflected in transmission line.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
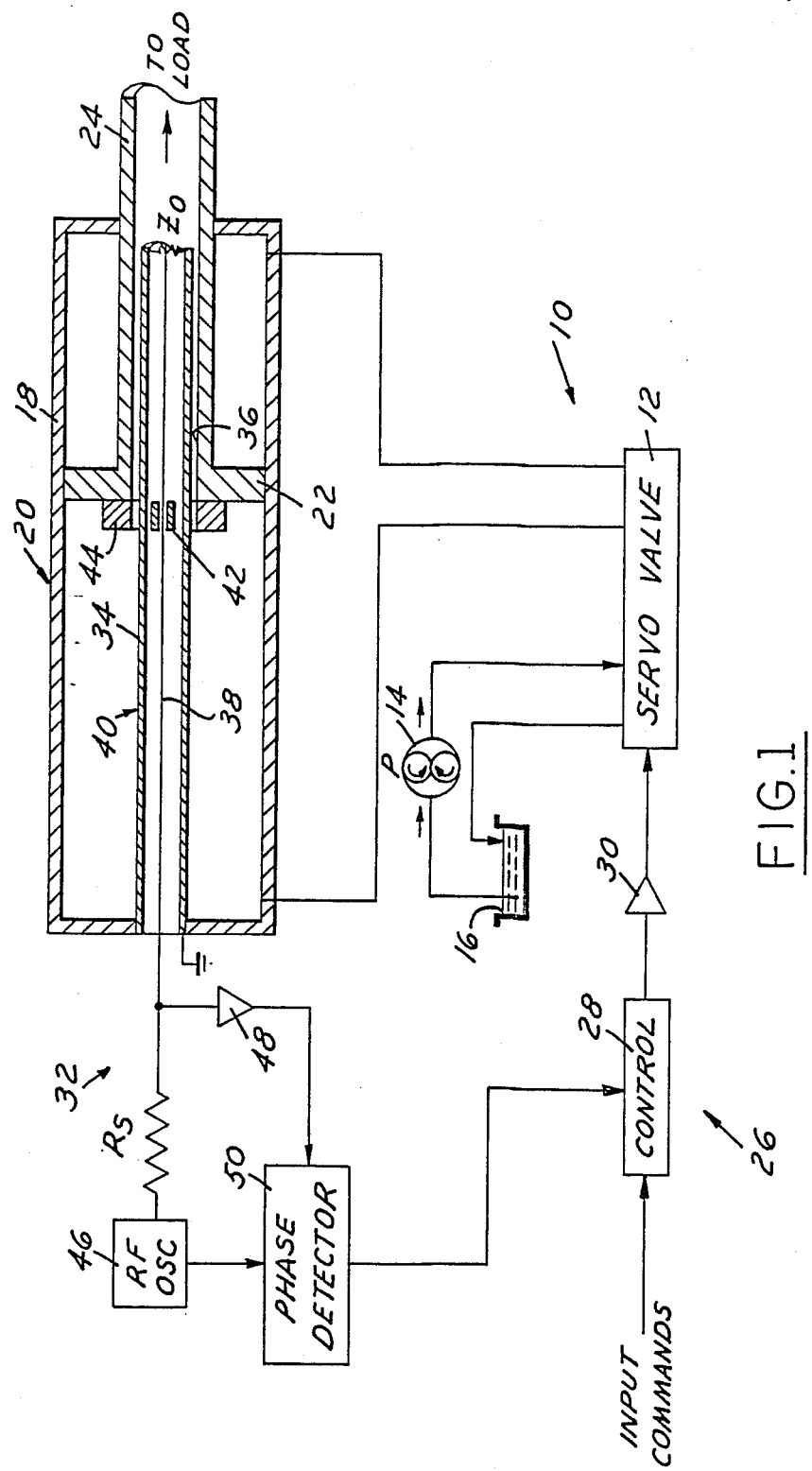
FIG. 1 is a schematic diagram of an electrohydraulic servo valve and actuator system which features piston position monitoring circuitry in accordance with a presently preferred embodiment of the invention.

FIG. 1 illustrates an electrohydraulic servo system 10 as comprising a servo valve 12 having a first set of ports connected through a pump 14 to a source 16 of hydraulic fluid, and a second set of ports connected to the cylinder 18 of a linear actuator 20 on opposed sides of the actuator piston 22. Piston 22 is connected to a shaft 24 which extends through one axial end wall of cylinder 18 for connection to a load (not shown). Servo electronics 26 includes control electronics 28, preferably microprocessor-based, which receives input commands from a master controller or the like (not shown), and provides a pulse width modulated drive signal through an amplifier 30 to servo valve 12. Position monitoring apparatus 32 in accordance with the present invention is responsive to position of actuator piston 22 for generating a position feedback signal to control electronics 28. Thus, for example, in a closed loop position control mode of operation, control electronics 28 may provide valve drive signals to amplifier 30 as a function of a difference between the input command signals from a remote master controller and position feedback signals from position monitoring apparatus 32.

In accordance with a preferred embodiment of the invention illustrated in FIG. 1, position monitoring apparatus 32 comprises a hollow cylindrical tube 34 affixed to and projecting from an end wall of cylinder 18 through a central aperture 36 in piston 22 and into the hollow center of rod 24. A wire 38 is centrally supported coaxially within tube 34, such that wire 38 and tube 34 form inner and outer conductors of a coaxial transmission line 40 having an air dielectric. Transmission line 40 is terminated within piston rod 24 and cylinder 18 in its characteristic impedance $Z_0$. A bead 42 of magnetically permeable material such as ferrite is freely slidably carried on wire 38 within tube 34. An annular magnet 44 is carried on the axial face of piston 22 externally surrounding tube 34, and is magnetically coupled to bead 42 such that the latter is magnetically drawn along wire 38 as a function of motion of piston 22 within cylinder 18.

An rf oscillator 46 has an output coupled through a resistor $R_s$ to transmission line 40 for launching radiation within the transmission line in the coaxial (TEM) mode of propagation. Wire 38 is also connected through an inverting amplifier 48 to one input of a phase detector 50, which receives a second input from an output of rf oscillator 46 which is at a phase angle of 90° to the oscillator output coupled to transmission line 40. The output of phase detector 50 provides position feedback to control electronics 28. Ferrite bead 42 forms an impedance discontinuity along the center conductor of transmission line 40 which causes a reflection of the rf radiation. The phase angle associated with this reflected energy, as compared with the phase angle of initial propagation, is directly proportional to the distance traveled to and from bead 42. Resistor $R_s$ is selected in conjunction with the output of impedance of oscillator 46 such that the reflected wave is absorbed. Resistor $R_s$ and the oscillator output impedance match the characteristic impedance $Z_0$ of transmission line 40. When the reflected wave combines with the incident wave, a phase shift results in the voltage vector at the transmission line input.

Figure 2:
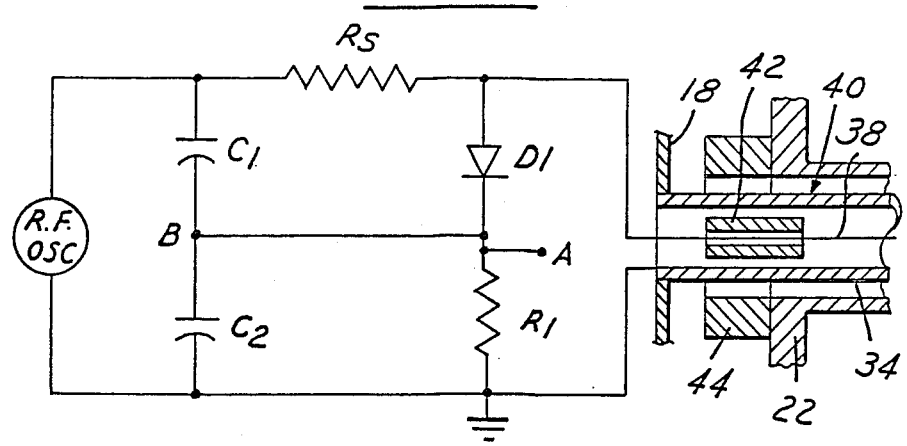
FIG. 2 is an elevational schematic diagram of alternative monitoring electronics.

Directional couplers may be employed to discriminate between incident and reflected energy in transmission line 40. FIG. 2 illustrates a bridge directional coupler which includes a pair of capacitors $C_1, C_2$ connected across oscillator 46. Oscillator 46 is also connected through resistor $R_s$ to wire 38. A diode $D_1$ and a resistor $R_1$ are connected in series between transmission line center conductor 38 and outer conductor 34. The dc signal appearing at point A, at the junction of diode $D_1$ and resistor $R_1$, is a direct measure of position of piston 22 within cylinder 18. In a modification to the embodiment of FIG. 2, capacitors $C_1, C_2$ may be replaced by varactors having capacitances controlled as a function of bridge voltage between point A and point B at the varactor junction (the connection between points A and B being deleted). Voltage is adjusted to renull the bridge wherein the voltage is then proportional to the distance travelled by the piston.

Figure 5:
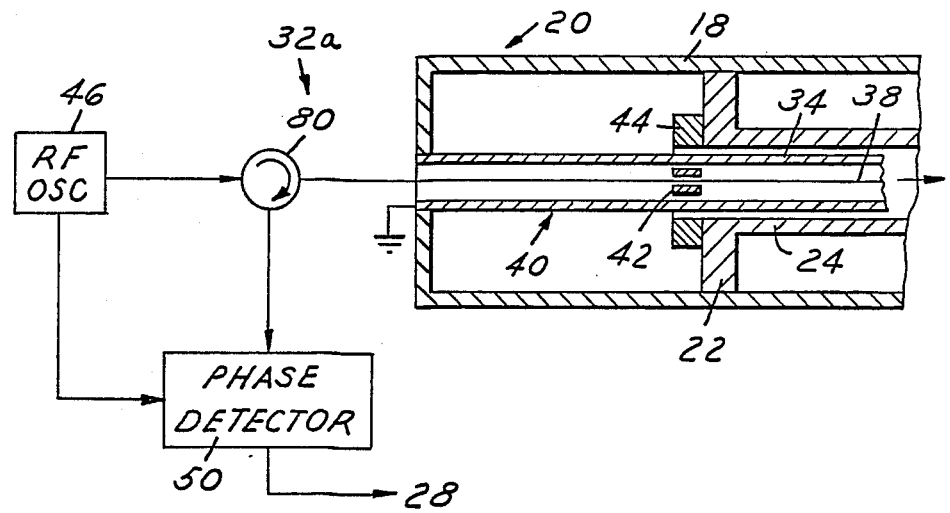
FIG. 5 is a fragmentary schematic diagram of a further embodiment of the invention.

FIG. 5 illustrates a modification 32a to the embodiment of FIG. 1 wherein a coaxial directional coupler 80 is employed for isolating the reflected wave from the incident wave. Phase shift at detector 50 is linearly porportional to piston position. Coupler 80 preferably comprises a strip-like coupler tuned to the operating frequency of oscillator 46.

Figure 3:
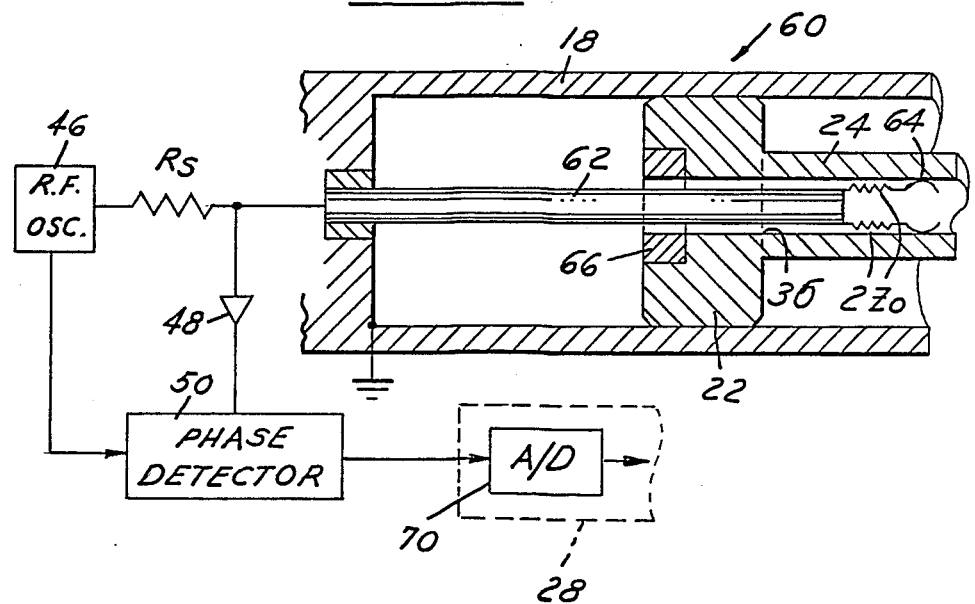
FIG. 3 is a schematic diagram of another embodiment of the invention.

FIG. 3 illustrates a modified coaxial transmission line 60 wherein the outer conductor is formed by cylinder 18 and the inner conductor 62 comprises a rod or wire which extends coaxially within cylinder 18 into aperture 36 of piston 22. The space between rod 62 and cylinder 18 is filled with hydraulic fluid, which thus forms the transmission line dielectric. Center conductor 62 is mechanically slidably supported by and electrically connected through a pair of termination resistors $2Z_0$ and a pair of brushes 64 to the internal bore of piston 22 and rod 24. The impedance-altering bead 66 in the embodiment of FIG. 3 comprises a ferrite annulus directly carried by piston 22 surrounding center conductor 62. The embodiment of FIG. 1 is considered preferable to the embodiment of FIG. 3 because the characteristics of the transmission line in the embodiment of FIG. 1 do not vary with temperature and pressure of the hydraulic fluid.

Figure 4A:
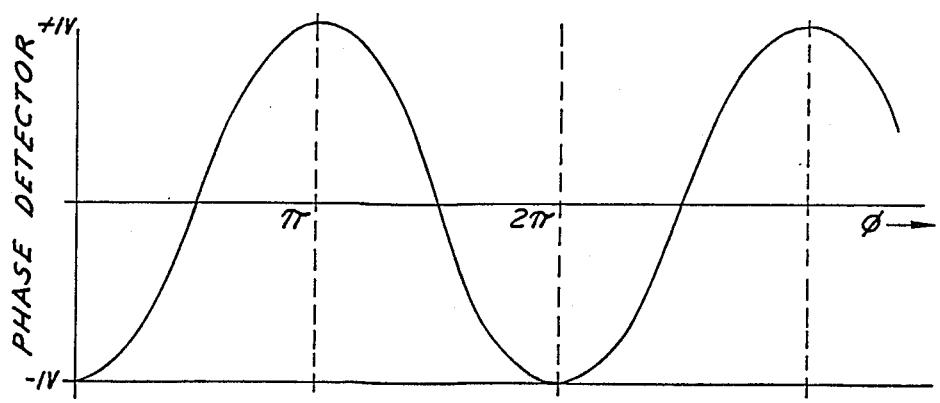
FIGS. 4A-4C are graphic illustrations useful in discussing operation of the embodiment of FIG. 3.
Figure 4B:
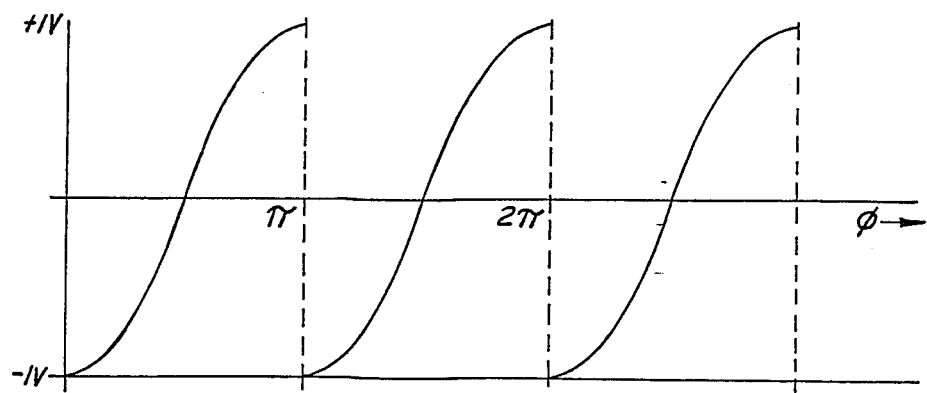
Figure 4C:
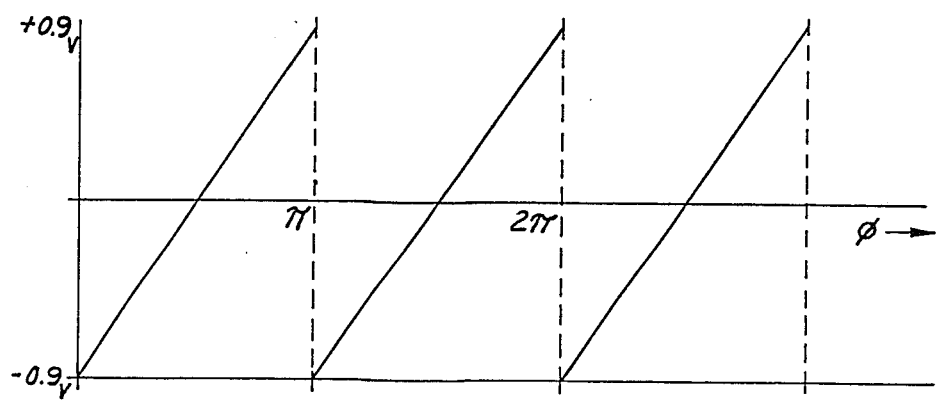

In a preferred digital implementation of the present invention, control electronics 28 includes an A/D converter 70 which receives the analog output of phase detector 50. To improve accuracy, a higher frequency oscillator can be used, so that as the piston moves, the phase angle rotates through multiple revolutions of two-pi radians. Two digital registers are employed, one of which accepts the carry output from the faster register to count the number of two-pi revolutions. FIG. 4A illustrates output of phase detector 50 for piston motion corresponding to three-pi revolution radians. FIG. 4B illustrate phase detector output when output slope is detected and reversed when the slope becomes negative. If the swing from −1 to +1 in FIG. 4B corresponds to ten bits at the output of A/D converter 70 (FIG. 3), then for travel of the wave down transmission line 60 and back, the total phase shift corresponds to pi radians. Because of rounding of the waveform in FIG. 4B near the −1 and +1 levels, less than full swing of the phase detector output is employed. FIG. 4C illustrates linearized output of phase detector 50 between −0.9 and +0.9 volt levels.

If the maximum stroke of piston 22 is one meter, the frequency of oscillator 46 required to give pi radians of phase shift for the one meter stroke, thus swinging the voltage from −1 volts to +1 volts out of the phase detector, is 75 MHz. IF the output of A/D converter 70 changes ten bits for the swing from −1 V to +1 V of pi radians of phase shift, then each bit corresponds to about one millimeter. If the frequency of oscillator 46 is increased to 750 MHz and a second counter is employed to monitor the carry output of the first A/D counter, a total of ten pi radians of phase shift is produced over the full one-meter piston stroke, yielding a resolution of 0.1 mm.

The invention claimed is:

1. Apparatus for determining position of a movable member comprising
   means forming a coaxial transmission line including center and outer electrical conductors,
   means for launching electromagnetic radiation along said line,
   means movable along said center conductor within said outer conductor for altering impedance characteristics of said transmission line,
   means for coupling said movable means to a movable member such that said movable means is positioned along said center conductor as a function of position of the movable member relative to said transmission line, and
   means responsive to electromagnetic radiation reflected by said transmission line for determining position of said movable member relative to said transmission line.

2. The apparatus set forth in claim 1 wherein said means forming said coaxial transmission line comprises a hollow tube forming said outer conductor and means centrally suspended within said tube forming said center conductor, and
   wherein said movable member comprises means of magnetically permeable material movably carried with respect to said suspended means within said tube.

3. The apparatus set forth in claim 2 wherein said tube and centrally suspended means have a characteristic impedance to electromagnetic radiation, and wherein said means forming said transmission line includes means terminating said transmission line in said characteristic impedance.

4. The apparatus set forth in claim 3 wherein said magnetically-permeable means is slidably carried by said center conductor, and wherein said coupling means comprises magnetic means carried externally of said tube and magnetically coupled to said magnetically-permeable means.

5. The apparatus set forth in claim 4 wherein said magnetic means comprises an annular magnet externally surrounding said tube.

6. The apparatus set forth in claim 3 wherein said movable member is positioned within said tube and includes a central aperture, said center conductor being slidably supported within said aperture and said magnetically-permeable means being carried by said movable member surrounding said aperture.

7. The apparatus set forth in claim 3 wherein said means for launching electromagnetic radiation comprises an rf generator having an output coupled to said transmission line, and wherein said means responsive to said reflected radiation comprises means responsive to phase angle of said reflected radiation with respect to said output.

8. The apparatus set forth in claim 7 wherein said phase angle-responsive means comprises a phase detector and an analog/digital converter.

9. An electrohydraulic servo system which includes a linear actuator having a cylinder and a piston variably positionable therewithin, a servo valve responsive to valve control signals for coupling said actuator to a source of hydraulic fluid and means responsive to position of said piston within said cylinder for generating said valve control signals, characterized in that said position-responsive means comprises
   means forming a coaxial transmission line within said linear actuator including a center conductor and an outer conductor, said transmission line having a characteristic impedance, an input at one end of said cylinder and means terminating said transmission line within said actuator in said characteristic impedance,
   means coupled to said piston and surrounding said center conductor within said outer conductor for altering impedance characteristics of said transmission line as a function of position of said piston within said cylinder,
   means coupled to said transmission line input for launching electromagnetic radiation in said transmission line, and
   means responsive to electromagnetic radiation reflected by said transmission line at said input for determining position of said piston within said cylinder.

10. The servo system set forth in claim 9 wherein said launching means comprises rf generator means having an output coupled to said input of said transmission line, and means responsive to phase angle of radiation reflected by said transmission line with respect to said output.

11. The servo system set forth in claim 9 wherein said piston has a central aperture coaxial with said cylinder, and wherein said means forming said coaxial transmission line comprises means mounted coaxially within said cylinder and projecting into said aperture.

12. The servo system set forth in claim 11 wherein said means forming said coaxial transmission linen comprises a hollow tube fixedly mounted to said one end of said cylinder to form said outer conductor, and a wire suspended within said tube to form said center conductor, and
   wherein said means coupled to said piston comprises means of magnetically permeable construction slidably carried by said wire within said tube, and permanent magnet means carried by said piston externally of said tube.

13. The servo system set forth in claim 12 wherein said permanent magnet means comprises means externally surrounding said tube for applying a uniform magnetic field to said magnetically-permeable means.

14. The servo system set forth in claim 11 wherein said means forming said coaxial transmission line comprises said cylinder forming said outer conductor and means slidably supported by said piston within said aperture forming said center conductor.

15. The servo system set forth in claim 14 wherein said means coupled to said piston comprises means of magnetically permeable construction carried by said piston surrounding said center conductor.

* * * * *